United States Patent [19]

Brune

[11] Patent Number: 4,949,028

[45] Date of Patent: Aug. 14, 1990

[54] MULTIPLE VOLTAGE BATTERY CHARGE BALANCING AND LOAD PROTECTING DEVICE

[75] Inventor: Lyle R. Brune, Beaverton, Oreg.

[73] Assignee: Sure Power, Inc., Tualatin, Oreg.

[21] Appl. No.: 259,184

[22] Filed: Oct. 18, 1988

[51] Int. Cl.[5] .................................................. H02J 7/14

[52] U.S. Cl. .......................................... 320/6; 320/15

[58] Field of Search .................. 320/6, 15, 17, 18, 61; 323/312, 313, 314, 315, 316; 307/9.1

[56] References Cited

U.S. PATENT DOCUMENTS

| | | | |
|---|---|---|---|
| 3,624,480 | 1/1971 | Campbell et al. | 320/15 |
| 3,667,025 | 5/1972 | Campbell et al. | 320/15 |
| 3,671,843 | 6/1972 | Huntzinger et al. | 320/15 |
| 3,710,226 | 1/1973 | Seike | 320/15 |
| 3,922,592 | 11/1975 | Quantz | 320/15 |
| 4,041,363 | 8/1977 | Scheidler | 320/17 X |
| 4,047,088 | 9/1977 | Himmler | 320/6 |
| 4,479,083 | 10/1984 | Sullivan | 320/6 |
| 4,672,294 | 6/1987 | Norton | 320/17 |
| 4,684,814 | 8/1987 | Radomski | 320/6 |

*Primary Examiner*—Mark O. Budd
*Assistant Examiner*—Kristine Peckman
*Attorney, Agent, or Firm*—Olson & Olson

[57] ABSTRACT

A multiple battery source of multiple voltages is connected to the input of a switching regulator in which the currents sourced by inverting and non-inverting inputs are compared for balance, and when the imbalance is generated by external circuitry and "error" current is detected by the comparator circuit which thereupon provides an electrical output correction signal to the switching circuitry to correct the imbalance.

9 Claims, 5 Drawing Sheets

MULTIPLE VOLTAGE BATTERY CHARGE BALANCING AND LOAD PROTECTING DEVICE

BACKGROUND OF THE INVENTION

This invention relates to multiple battery electric load systems, and more particularly to a device for distributing the current in a mulit-battery, multi-voltage electric load system such that the batteries in the system are protected from damage due to an imbalance of charge and the loads connected to the system are not damaged due to improper voltage.

Many electrical systems utilize separate battery banks or batteries connected in series to provide multiple voltages for starting engines, lighting and supporting electronic equipment. Examples of these systems are found on diesel powered trucks, marine equipment and off-road construction equipment. Much of this equipment uses 24 volts or higher for starting engines and running radar, and 12 volts for lights, radios and the like.

In such systems the problems exist of maintaining proper battery charge of the multiple voltages from the system charging source, typically but not limited to an alternator. Further, in the event of loss or disconnection of the negative terminals of the batteries from the common ground of the system, the potential exists for damage to equipment connected to the lower voltage of the system voltages due to the reversal of polarity in these loads.

Typical of such prior art systems is that disclosed in U.S. Pat. No. 4,479,083 in which a conventional voltage divider, such as those used to bias power amplifiers, is employed.

SUMMARY OF THE INVENTION

In its basic concept, my invention provides for the balancing of charge of batteries in a multiple battery system and for protection of polarity sensitive loads which are connected to the system by providing regulated output voltages which are proportional to the input voltage such that the charge that is present on the battery bank of the input voltage may be used to manage the charge of batteries supplying the output loads.

It is the principal objective of this invention to provide for the proper charge management of multiple voltage battery banks, either separate banks or series-tapped banks.

Another objective of this invention is the provision of a dual voltage load protection device of the class described which affords protection of loads from damage due to reverse polarity.

Still another objective of this invention is the provision of a dual voltage load protection device of the class described which will not be damaged by output short circuit, output overload, or excessive or insufficient input voltage.

The foregoing and other objectives and advantages of this invention will appear from the following detailed description, taken in connection with the accompanying drawings of preferred embodiments.

DESCRIPTION OF THE PREFERRED EMBODIMENTS

As stated hereinbefore, the dual voltage load protection device of this invention provides a regulated output voltage which is proportional to the input voltage such that the charge that is present on the battery bank of the higher voltage may be used to manage the change of a lower voltage battery bank or the lower voltage portion of the same tapped bank. This allows loads to be connected between the higher voltage and the common ground of the system and the lower voltage and the system common ground while maintaining proper battery charge management.

Two outputs are provided. One of the outputs serves to manage the charge of the lower voltage battery bank and heavy loads which are not polarity sensitive. The second output is diode protected to allow current to flow only in the desired direction through loads that may be damaged by reverse polarity.

Figure 1:
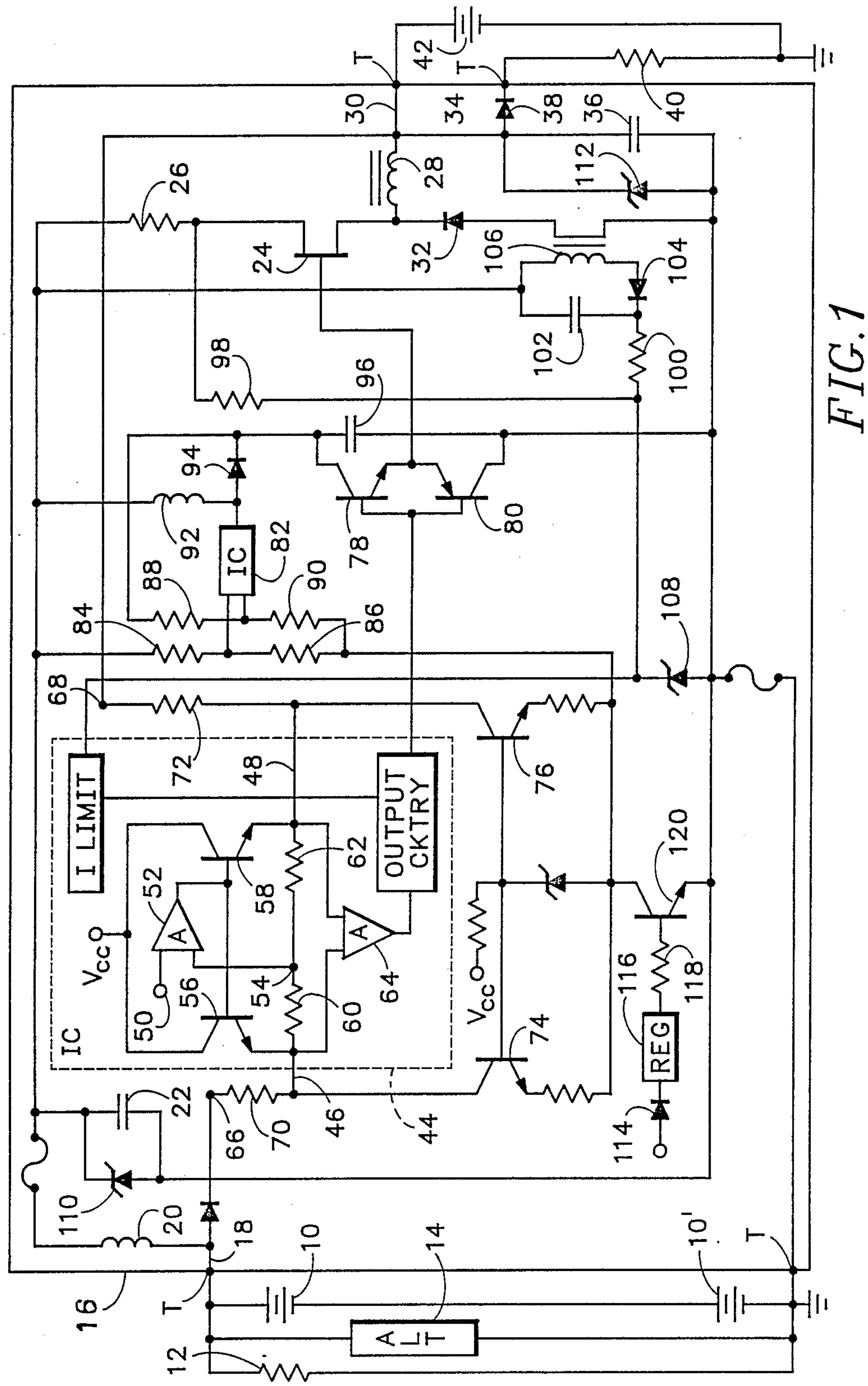
FIG. 1 is a schematic diagram of an electrical circuit of a dual voltage load protection device embodying the features of this invention.

Referring to FIG. 1 of the drawings, a voltage source, such as the battery bank 10 and 10' illustrated, supplies power to a high voltage load 12. The batteries may be charge by an alternator 14 or other suitable charging source, such as solar cells, generators and the like.

The battery bank is connected to the input terminals of a switching regulator such that the negative terminal is connected to a common ground and the positive source terminal provides current to the switching regulator as a connected load. More than one load may be connected to the source. The switching regulator and the associated circuitry of the device are contained within a suitable housing 16. The electrical components external to the circuitry within the housing are connected to the internal circutry conveniently by electrical terminals T carried by the housing.

The current to the switching regulator is supplied through input conductor 18 to an inductor 20 which reduces feedback of switching noise to the input. A capacitor 22 is provided to stabilize current ripple. When the field effect transistor (FET) switch 24 is closed, current from the input flows through a resistor 26, the FET 24, and the inductor 28 to the output conductor 30. When the FET switch is turned off, the flyback voltage generated by the inductor 28 forces the diode 32 to conduct. This causes current to continue to flow in the same direction into the output 30 and output 34. A capacitor 36 is provided to smooth current ripple in the output. A diode 38 is provided in output 34 to protect load 40 from damage should a reversal of polarity occur between the output 30 and common ground. An unprotected load, such as battery 42, may be connected to output conductor 30.

The output voltage is controlled by the duty cycle, or on-to-off ratio of the FET switch 24. The FET duty cycle is in turn controlled by the integrated circuit 44. In the embodiment illustrated, the integrated circuit is the switching regulator LM 1578 produced by National Semiconductor Corporation.

The integrated circuit 44 includes a comparator input stage in which the non-inverting input 46 and inverting input 48 are referred to a fixed reference voltage 50, for example 1 volt. Amplifier 52 forces the node voltage at the junction 54 to equal the reference voltage 50 by adjusting the modified emitter followers 56 and 58. When the currents sourced by the inputs 46 and 48 are equal, no current flows through the small sensing resistors 60 and 62, and therefore no "error" voltage is detected by the comparator 64.

When an imbalance in current is generated in the inputs 46 and 48 by circuitry external to the integrated circuit 44, a small voltage is generated in the resistors 60 and 62. An imbalance is generated at the input whenever the voltage at the junctions 66 and 68 of resistors 70 and 72, respectively, are not in the correct relation to each other. As a result, the current flowing in the current sink 74, algebraically summed with the current flowing in the resistor 70, yields a resultant current flowing at input 46. Similarly, the current flowing in the current sink 76, algebraicallly summed with the current flowing in the resistor 72 yields a resultant current flowing at input 48. If these resultant currents are not equal, the imbalance of current at the inputs 46 and 48, respresents an error current which is detected by the sensing resistors 60 and 62 and the comparator 64. The comparator, in turn, provides an output correction signal to the switching circuitry to correct the imbalance at the inputs.

Two factors must be considered when determining the relationship between the voltages at the junctions 66 and 68. First is the tracking ratio which is the change in voltage at junction 68 for a unit change in voltage at the junction 66. Since the voltage at the inputs 46 and 48 is held at a fixed reference (virtual ground) and the input currents must be balanced, any change of current in the resistor 70 due to a change in voltage at the junction 66 must equal the change in current in the resistor 72 resulting from the change in voltage at the junction 68. From this relationship it is apparent that the change in voltage at the junction 66 divided by the change in voltage at the junction 68 must equal the ratio of resistor 70 to resistor 72.

Second is the offset voltage which is a difference between the voltage at junction 66 and the voltage at junction 68. This voltage difference is algebraically added to the voltage resulting from the tracking ratio. The offset voltage is determined by the difference in currents of the current sinks 74 and 76. Since the voltage at the inputs 46 and 48 appears as part of the offset voltage, it appears in the calculation of the current sinks such that the current of sink 74 is equal to the input current of integrated circuit 44 plus the difference in the voltage at the junction 66 and the reference voltage 50 divided by the resistor 70. The current sink 76 is calculated in a similar manner, using the respective components. The foregoing components must be chosen such that the inputs of the integrated circuit 44 will not sink more than the specified limits over the full dynamic range of the switching regulator.

In actual practice, since the integrated circuit inputs are held at a reference voltage with respect to the common ground, the current sinks may be replaced with resistors without changing the integrity of the circuit.

To illustrate the foregoing, if the desired tracking ratio is 0.5 volts change at the junction 68 for each volt change at the junction 66, the ratio of resistor 70 to the resistor 72 is 2. If no voltage offset is desired, for example 24 volts at junction 66 and 12 volts at junction 68, then the current sink 74 will be required to sink the current of 24 volts minus 1 volt (the reference voltage) or 23 volts divided by resistor 70 plus the current of the input 46. The current sink 76 will be required to sink the current of 12 volts minus 1 volt divided by resistor 72, plus the current of the input 48, which is equal to the current of the input 46.

For the system to operate in a balanced condition, i.e. with the output properly controlled, the currents at the inputs 46 and 48 of the integrated circuit 44 must be equal. For this requirement to be met, the current in current sink 74 must equal that of resistor 70 plus the integrated circuit reference current 50, and the current in current sink 76 must equal that of resistor 72 plus the integrated circuit reference current. This requires that the input to output tracking ratio is determined by the ratio of resister 70 to resistor 72, and the input to output offset and dynamic range is determined by the current sinks 74 and 76. Any "error" detected by the integrated circuit 44 is converted to a change in duty cycle and is fed to the gate of the FET 24 through the buffer transistors 78 and 80. Since the FET is operated as a "source follower", the gate drive voltage must exceed the input voltage of battery bank 10 and 10'. This higher voltage is provided by a switching regulator internal to the device comprised of integrated circuit 82, resistors 84, 86, 88 and 90, inductor 92, diode 94 and capacitor 96. Integrated circuit 82 is the same as integrated circuit 44.

The resistors 98 and 100, capacitor 102, diode 104 and inductor 106 provide a unique output short circuit and over current protection which is connected to an over current comparator in the integrated circuit 44. The Zener diode 108 provides over voltage shut down, and the resistor 26 provides input over current protection. The Zener diodes 110 and 112 provide transient suppression. Diode 114, voltage regrlator 116, resistor 118 and transistor 120 form a switch such that when a voltage is applied to the diode 114, as by turning on an ignition switch, which is greater than the threshold set by the voltage regulator 116, the device will be activated. If the voltage at the diode 114 falls below this threshold, the device will be deactivated.

Figure 2:
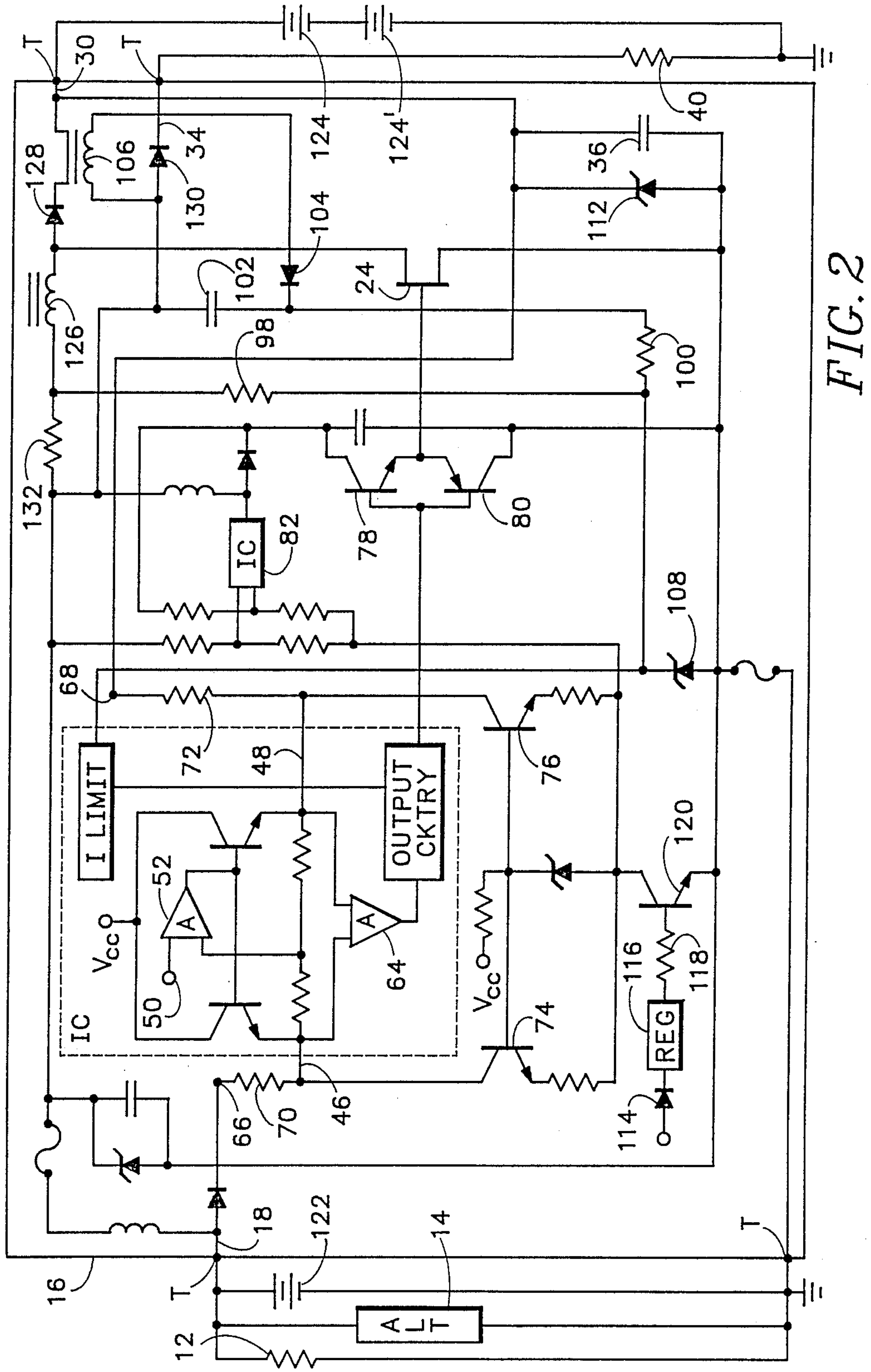
FIG. 2 is a schematic diagram illustrating a modification of the electrical circuit of FIG. 1 by which the input and output voltages may be reversed.

FIG. 2 illustrates a modification of the output configuration of FIG. 1 by which the higher voltage input source 10, 10' of FIG. 1 is replaced with a lower voltage battery 122 and the lower voltage output load or battery 42 is replaced with a higher output load or battery bank 124, 124'. Thus, in the configuration of FIG. 2, when the FET switch 24 is turned on by the buffer transistors 78 and 80, current starts flowing in inductor 126, thereby storing energy in its magnetic field. When the FET switch turns off, the flyback voltage generated by the inductor 126 causes diode 128 to turn on and thus cause current to flow into the load 124, 124'. Diode 130 serves the same load protecting function for load 40 as does diode 38 for load 40 in FIG. 1. Resistor 132 performs the same input over-current protection as resistor 26.

Figure 3:
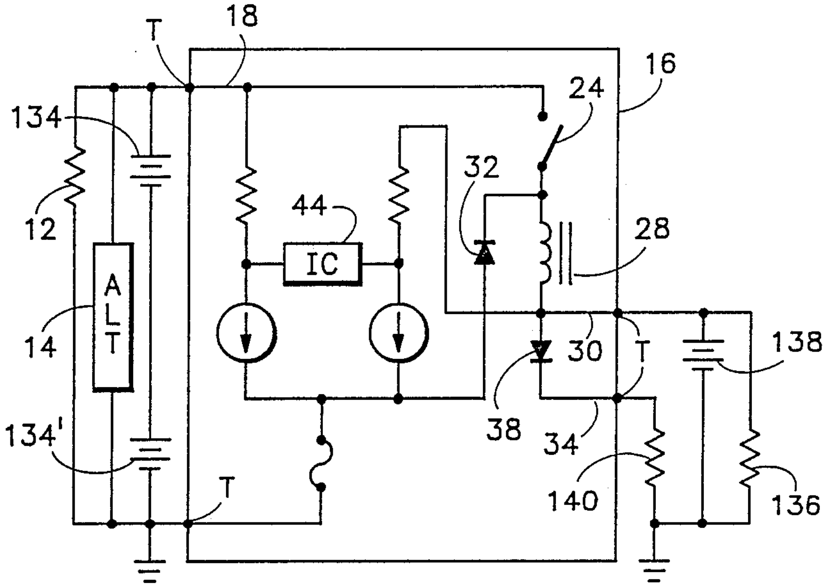
FIGS. 3, 4, 5, and 6, 7, 8 are schematic diagrams illustrating a variety of connections of the devices of FIGS. 1 and 2, respectively, to different battery and load configurations.

FIG. 3 illustrates the connection of the device in a system with the input connected to a higher voltage, illustrated by the two batteries 134 and 134', and the unprotected output load 136 is connected to a lower voltage, illustrated by the single battery 138. The load protection output is connected to a load 140. However, it is not necessary for the load to be present in order for the device to operate.

Figure 4:
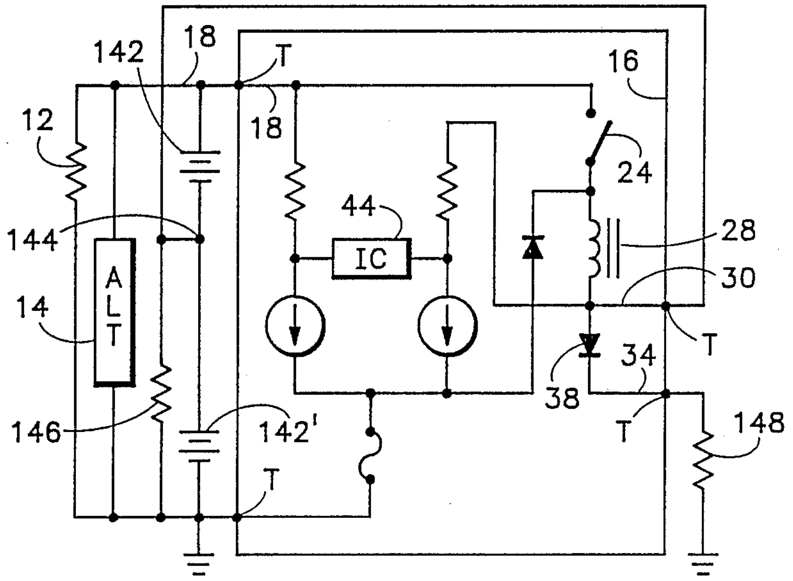

FIG. 4 illustrates the input of the device connected across a series connected set of batteries 142 and 142' and the outputs connected to a lower voltage tap 144 of the same set of batteries. An unprotected load 146 may be connected between the center tap 144 and ground. The load protection output is connected to a load 148.

Figure 5:
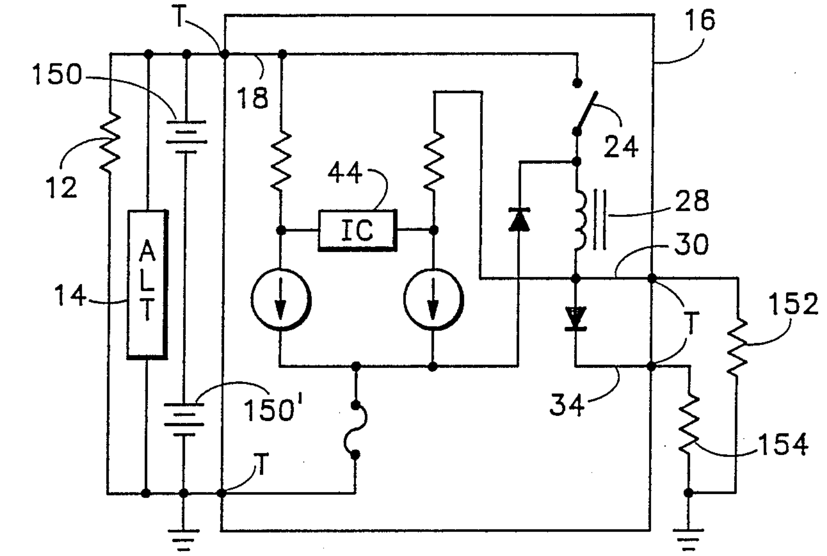

FIG. 5 illustrates the input of the device connected to a high voltage source provided by the bank of batteries 150 and 150' and its outputs connected to lower voltage unprotected load 152 and protected load 154.

Figure 6:
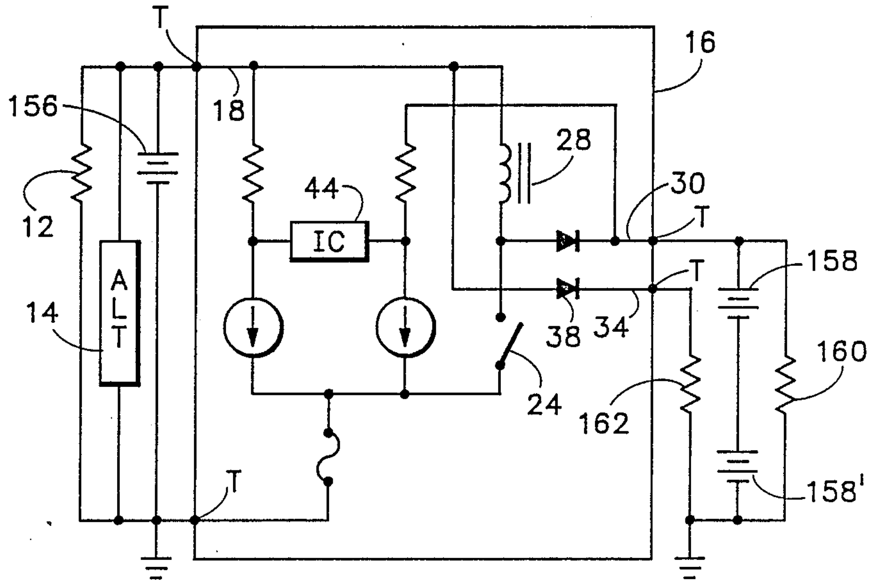

FIG. 6 illustrates a lower voltage battery 156 connected to the input and higher voltage batteries 158 and 158' connected to the unprotected output load 160. The protected load 162 is still connected to the lower voltage.

Figure 7:
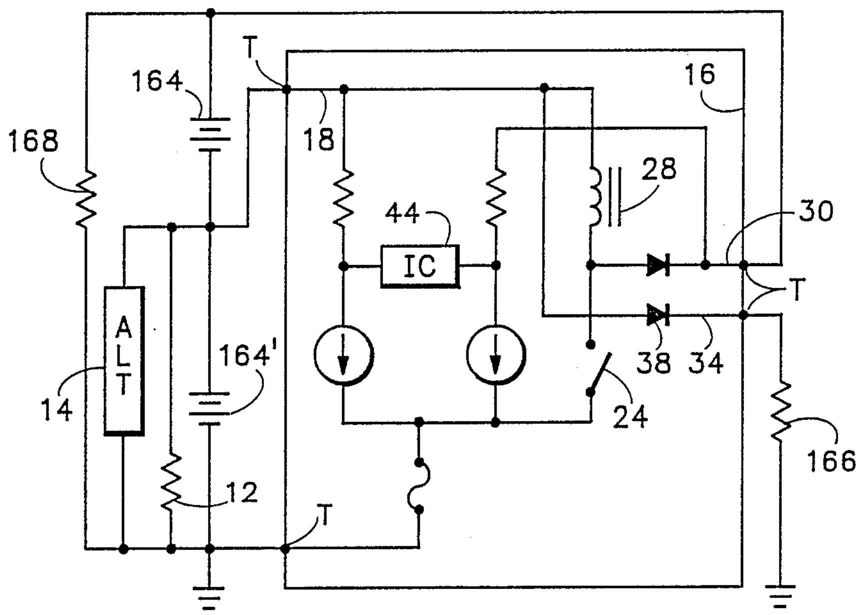

FIG. 7 illustrates the input of the device connected to the lower voltage battery 164' and the load 168 connected to the higher voltage of the series connected batteries 164 and 164'. The protected lower voltage load is 166 and an unprotected load 12 is connected across the battery 164'.

Figure 8:
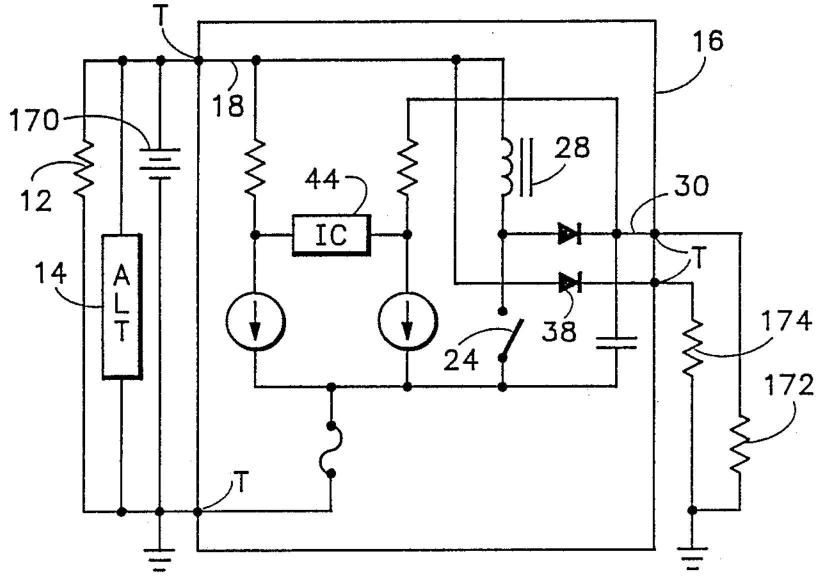

FIG. 8 illustrates the input of the device connected to the lower voltage battery 170 and the output connected to an unprotected load 172 requiring a higher voltage. The protected load 174 is still connected to the lower voltage.

A typical application of the device of this invention is a vehicle such as a military truck requiring a 24 volt system for engine starting, engine controls and other heavy electrical loads, such as winches. Also required is a 12 volt system to operate reliable economical lighting, some radios and other equipment designed for 12 volt operation. Further, the device allows the use of dissimilar batteries connected in series which is not reliable in conventional systems.

Since the vehicle charging system is typically 24 volts, the easiest and most economical method of obtaining 12 volts is to "center tap" the 24 volt battery bank. This technique presents two distinct problems. First, because the loads placed on the 12 volt battery draw current from that battery only and the loads placed on the 24 volt battery draw current from both batteries, the discharge of the two batteries is unequal. When charging the series-connected batteries from the vehicle charging source, the change current is also unequal since a portion of the charging current flows from the center tap through the 12 volt loads, rather than through the 12 volt batteries. Secondly, if the negative terminal of the series-connected batteries is disconnected, a possible condition exists which forces a change of polarity between the center tap and chassis common which in turn may damage equipment such as radios that are connected between these two points.

For the purpose of this example, the device is connected in the configuration of FIG. 4. The input of the device is connected across the 24 volt battery bank consisting of two series connected 12 volt batteries 142 and 142'. The 24 volt vehicle loads 12 and alternator 14 are also connected across this same battery bank. The output of the device is connected between the center tap 144 of the battery bank and common. 12 volt loads 148 that are sensitive to reverse polarity are connected to the protected output. 12 volt loads 146 not sensitive to reverse potarity may be connected across this battery 142', as illustrated.

When the vehicle is running, the alternator 14 maintains the proper voltage across the 24 volt battery bank 142 and 142' and compensates for any current required by 24 volt loads 12. When current is required by 12 volt loads 146 and/or 148, this current flows through the top battery 142 and is added to the charging current of that battery. Since this current does not flow through the bottom battery 142', an imbalance in charging current an consequently an imbalance in voltage occurs between the batteries. The voltage of both batteries in series will remain constant, maintained by the altrenator, while the voltage of the top battery 142 increases above its desired limit and the voltage of the bottom battery 142' decreases below its desired limit. When this condition occurs, the feedback voltage at junction 68 (FIG. 1) decreases, causing a reduction of current in resistor 72.

An imbalance in current now exists in resistors 70 and 72, causing current to flow from non-inverting input 46 to inverting input 48. As this current flows through sensing resistors 60 and 62, a small voltage is generated between the inputs 46 and 48, positive to negtive, respectively. This error signal voltage is detected by comparator 62 and is fed to the output circuitry which changes the on-to-off ratio (duty cycle) of the FET 24.

When the FET switch is on, i.e. the output circuit of integrated circuit 44 turns transistor 78 on which pulls the gate of the FET 24 high, current begins to flow from the device input 18 through inductor 20, resistor 26, FET 24 and inductor 28 to the device outputs 30 and 34. The longer the FET 24 is on, the higher the rate of current flow and the larger the magnetic field developed in inductor 28.

When the FET 24 is turned off, the collapse of the magnetic field of inductor 28 generates a flyback voltage which turns on the diode 38, causing current to flow from the common ground through diode 38 and inductor 28 to the device outputs 30 and 34. This current flows in the same direction as when the FET 24 is on, forming a continuous current from the device outputs which is proportional to the duty cycle of the FET 24.

As the output current increases, it approaches the required 12 volt load current. When these two currents are equal, the 12 volt load current no longer flows through the top battery 142. The current flowing through the series batteries is now only charge current which restores the required voltage for each battery. When the battery voltages are restored, the voltages at junctions 66 and 68 are at the proper ratio and the currents through resistors 70 and 72 are again balanced.

If the device is allowed to operate by applying voltage to the diode 114 and the vehicle is not running as described above, the alternator 14 is not providing current for the 24 volt loads 12. In this case the 24 volt load current is provided by the series-connected batteries 142 and 142'. The device operates as described above and only one-half of the effective 12 volt load current flows from the center tap 144 of the series batteries.

Since the device maintains the proper voltage ratio between the total of the series-connected batteries and the lower voltage battery 142', the proper state of charge is maintained or managed even though the batteries in the series are of different sizes or age. A difference of this type is not allowed in conventional series-connected batteries.

From the foregoing it will be appreciated that the present invention provides for the proper charge management of multiple voltage battery banks from a single charging source, by means of a device which is of simplified construction for economical manufacture. The device affords the additional advantages of protecting sensitive loads from reverse polarity, protection of the device itself from reverse polarity, protection against loss of common ground and protection against output short circuit, output overload or excessive or insufficient input voltage.

It will be apparent to those skilled in the art that various changes may be made in the configuration of the electronic circuitry and in the type, size and number of components thereof, without departing from the spirit of this invention and the scope of the appended claims.

I claim:

1. For use in an electric supply system having a battery system providing an input voltage and a plurality of output voltages of different magnitudes for corresponding electric outputs and including means for charging the battery system, a device for maintaining a predetermined battery charge ratio, comprising:

(a) an electric input, (b) a plurality of electric outputs, (c) means for developing an error current proportional to the difference between a predetermined ratio of input to output voltage of a battery system and the actual ratio of input to output voltage of said battery system, and (d) means responsive to said error current to change the current flow at said plurality of electric outputs to return the battery system input to output voltage ratio to said predetermined ratio.

2. The device of claim 1 wherein the means for developing an error current comprises:

(a) means for converting battery system input and output voltages to currents, (b) means for providing a reference current for the input current, (c) means for providing a reference current for the output current, (d) means for algebraically summing the input current and input reference current, (e) means for algebraically summing the output current and output reference current, and (f) means for comparing the algebraically summed input and output currents and detecting any difference therebetween as an error current.

3. The device of claim 2 wherein the means for providing reference currents for the input and output currents are current sinks.

4. The device of claim 1 wherein the means responsive to the error current comprises control means responsive to said error current for controlling the flow of current between the electric input and electric outputs to return the battery system input to output voltage ratio to said predetermined ratio.

5. The device of claim 1 including polarity sensitive means in at least one of said outputs for ensuring current flow in one direction only.

6. The device of claim 1 wherein the means responsive to the error current is arranged to control the current flow from a higher voltage input to a lower voltage output.

7. The device of claim 1 wherein the means responsive to the error current is arranged to control the current flow from a lower voltage input to a higher voltage output.

8. The device of claim 1 wherein the means responsive to the error current includes switch means in at least one of said electric outputs, and means for controlling the on-to-off ratio of the switch means for changing the current flow at said at least one of said electric outputs.

9. The device of claim 8 including energy storing means and rectifier means in the said at least one of said electric outputs; with the switch means for providing continuous current flow in the said at least one of said electric outputs.

* * * * *

UNITED STATES PATENT AND TRADEMARK OFFICE
CERTIFICATE OF CORRECTION

PATENT NO. : 4,949,028

DATED : 14 August 1990

INVENTOR(S) : Lyle R. Brune

It is certified that error appears in the above-identified patent and that said Letters Patent is hereby corrected as shown below:

ON TITLE PAGE:
Abstract, fifth line, "and" should read --an--.

Column 2, line 15, "change" should read --charge--.

Column 4, line 38, "regrlator" should read --regulator--.

Column 5, line 45, "change" should read --charge--.

Signed and Sealed this

Twenty-seventh Day of August, 1991

*Attest:*

HARRY F. MANBECK, JR.

*Attesting Officer*

*Commissioner of Patents and Trademarks*